United States Patent [19]
Hoeh

[11] 4,219,291
[45] Aug. 26, 1980

[54] SEGMENTED HELICAL ROTARY CUTTER AND METHOD OF MAKING SAME

[76] Inventor: James A. Hoeh, 33 N. Seventh St., Sebewaing, Mich. 48759

[21] Appl. No.: 20,441

[22] Filed: Mar. 14, 1979

[51] Int. Cl.$^2$ .................. B26D 1/12; B21K 21/00; B02C 1/08
[52] U.S. Cl. .................. 407/31; 76/101 A; 241/236; 407/63
[58] Field of Search .................. 407/31, 33, 120, 27, 407/45, 63; 241/294, 236; 76/101 A; 144/236

[56] References Cited
U.S. PATENT DOCUMENTS

| | | | |
|---|---|---|---|
| 7,264 | 8/1876 | Thompson | 407/31 |
| 1,432,580 | 10/1922 | Vauclain | 407/31 |
| 1,713,273 | 5/1929 | Farrington | 407/31 |
| 2,119,298 | 5/1938 | Simowski | 407/27 |
| 2,305,145 | 12/1942 | Dalzen | 407/27 |
| 3,946,474 | 3/1976 | Hahn et al. | 407/45 |
| 3,986,543 | 10/1976 | Slayton et al. | 76/101 A |

FOREIGN PATENT DOCUMENTS 2524086  2/1976  Fed. Rep. of Germany .......... 241/236

*Primary Examiner*—Harrison L. Hinson
*Attorney, Agent, or Firm*—Harness, Dickey & Pierce

[57] ABSTRACT

A rotary cutter and method of making same having a plurality of wear resistant material tipped helical cutting teeth therealong and comprising a plurality of cutter discs removably mounted in stacked relationship on a mandrel. Each disc comprises a circular member having a plurality of circumferentially spaced cutting teeth extending therearound and wherein each cutting tooth incorporates a hard, wear resistant insert having a helical rake facet and a helical relief facet defining the cutting edge which is in the form of a true geometrical helix. Coacting means are provided on the mandrel and each disc for rotationally positioning and aligning the discs such that the helical cutting edges thereon define in combination a substantially continuous geometrically true helical cutting edge extending the entire length of the cutter.

16 Claims, 5 Drawing Figures

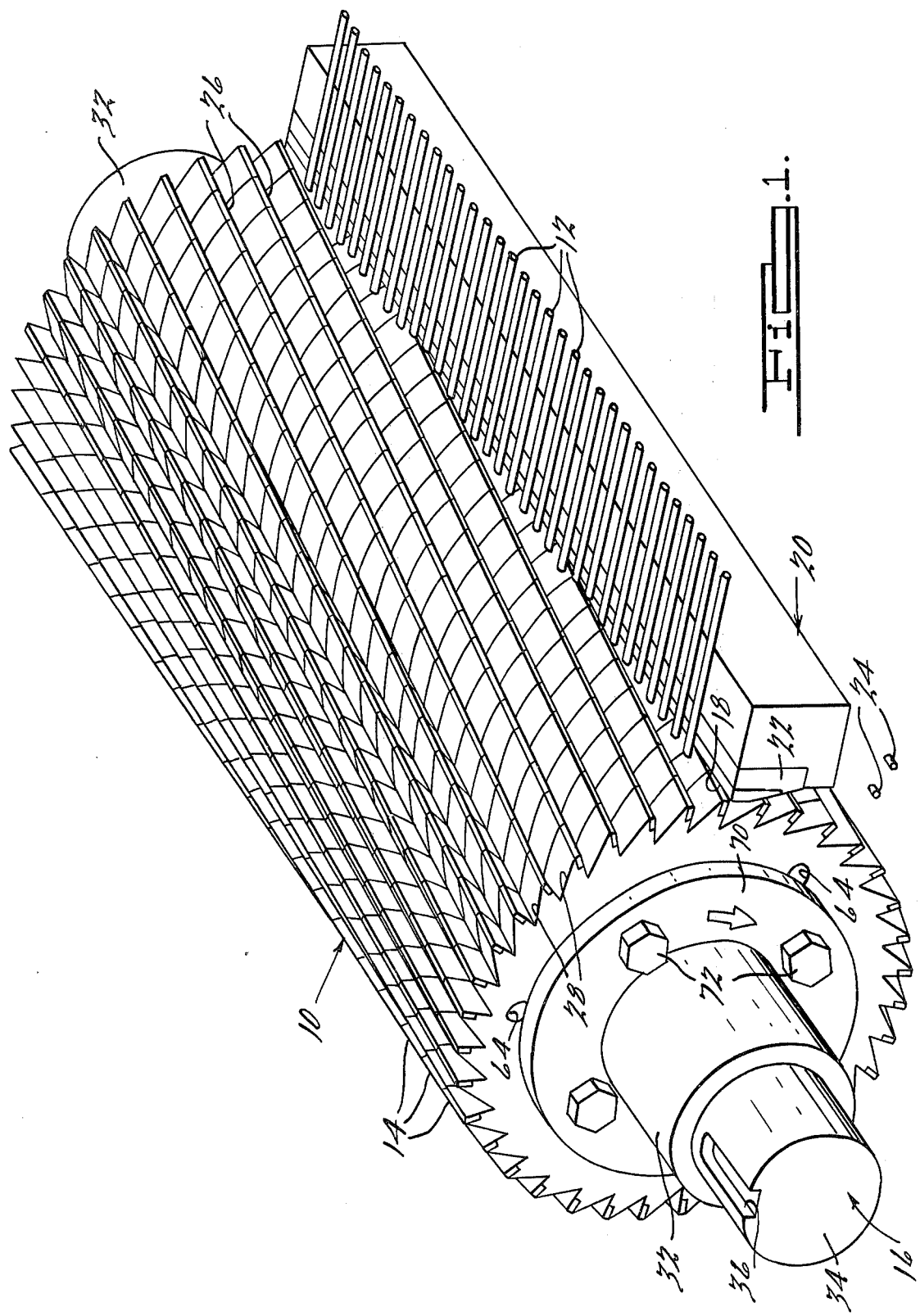

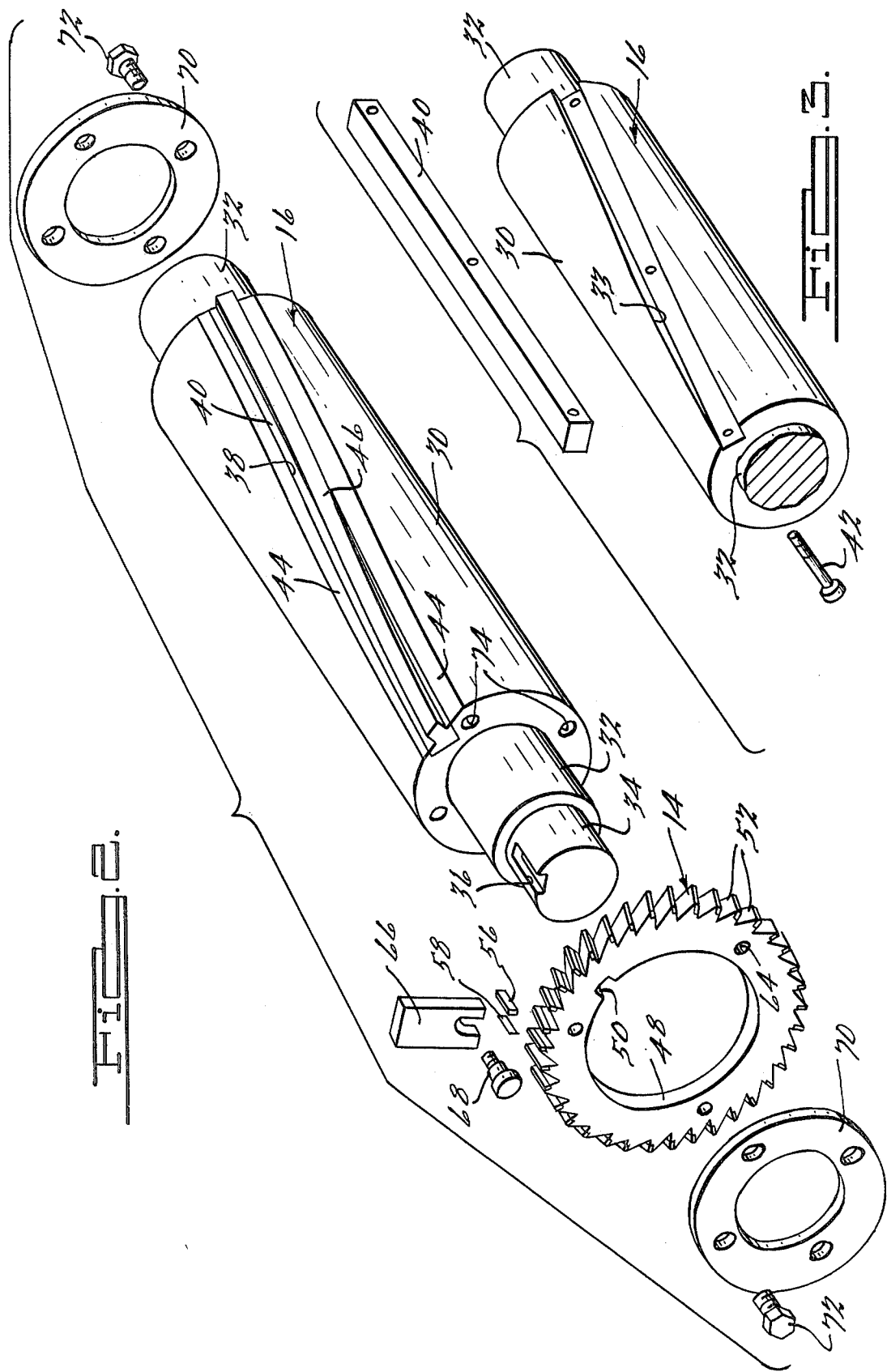

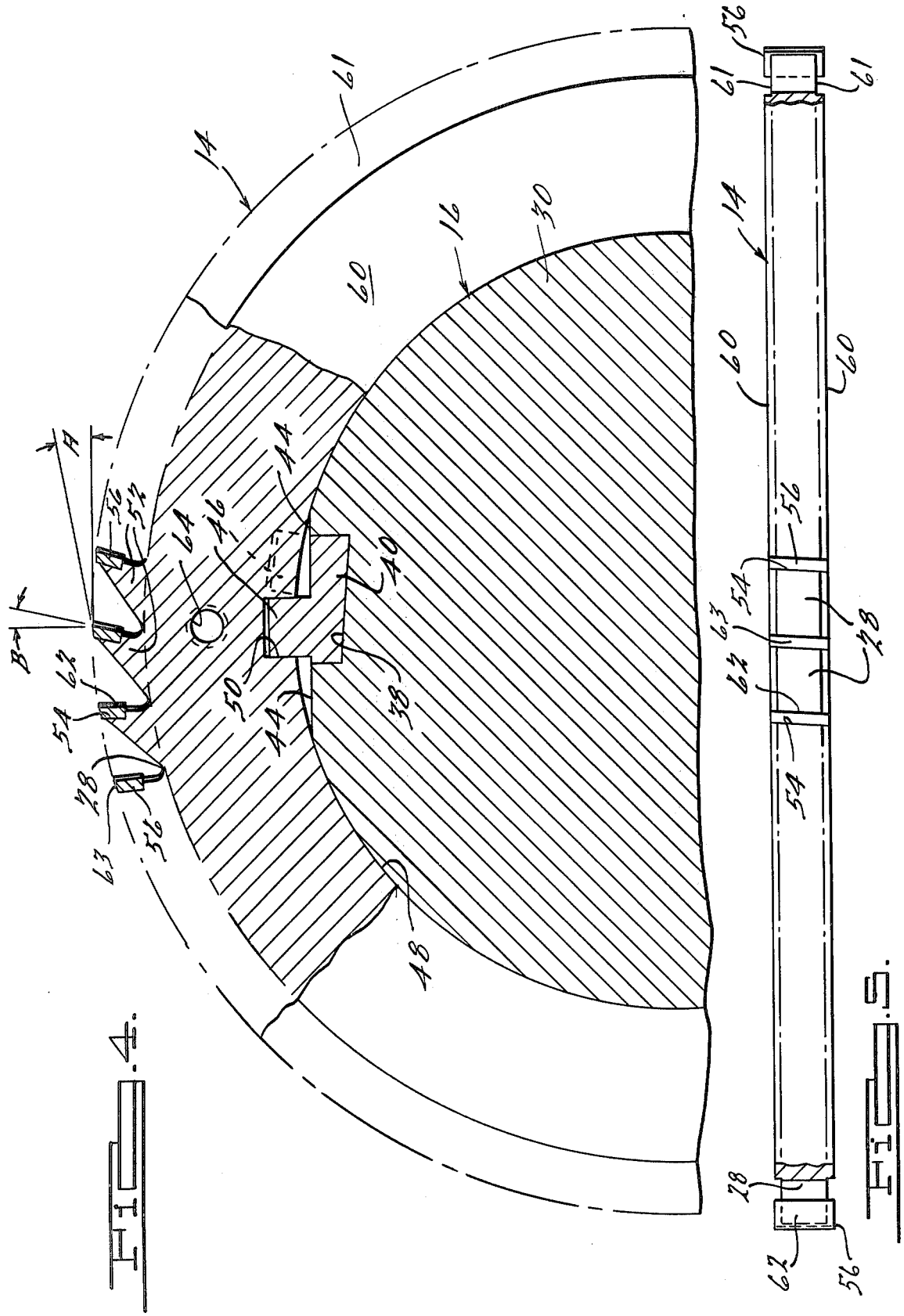

SEGMENTED HELICAL ROTARY CUTTER AND METHOD OF MAKING SAME

BACKGROUND OF THE INVENTION

The present invention broadly relates to rotary cutters of the type suitable for use for milling, planing, size reduction, pelletizing, and the like, and more particularly, is directed to an improved rotary cutter having wear resistant tipped cutting teeth disposed on a true geometrical helix. A variety of rotary cutters have heretofore been used or proposed for use for various cutting and milling operations which are comprised of high strength wear resistant tool steels and special alloys in an effort to prolong the useful cutting life of the toothed elements thereon between sharpening operations. The disposition of the cutting edges on a true geometrical helix provides for distinct advantages in the efficiency of operation of the rotary cutter as well as in the cutting action obtained. In the use of such helical rotary cutters for pelletizing or comminuting filaments and strands of various plastic materials the abrasive nature of many such plastics has occasioned a relatively rapid degree of wear of the cutting edges in spite of the use of special tool steels and alloys. The loss of sharpness of the cutting edges during such pelletizing operations is accompanied by a reduction in efficiency and an increased quantity of unusable fines produced as well as irregularity in the size and/or shape of the pellets produced.

There has, accordingly, been a long felt heretofore unfilled need for rotary helical cutters incorporating cutting edges comprised of a hard wear resistant material such as a sintered or cemented carbide material which substantially prolongs the useful operating life of the cutter thereby substantially reducing the costly and time consuming practice of frequent resharpening operations and the associated down time of the process and loss of production.

The present invention overcomes the problems and disadvantages associated with rotary cutters of the types heretofore known providing for a rotary helical cutter and method of fabricating such cutter in which at least the cutting edge portions are comprised of a hard wear resistant material and are oriented in a true geometrical helical configuration providing for optimum efficiency and cutting action. The present invention further provides a rotary cutter which is of simple manufacture, durable operation, which incorporates a plurality of identical cutting discs enabling simple replacement of individual damaged cutting discs and which substantially reduces the frequency of sharpening cycles and loss of valuable productivity.

SUMMARY OF THE INVENTION

The benefits and advantages of the present invention are achieved by a rotary cutter having a plurality of helical cutting teeth extending longitudinally therealong in which the cutting edge portion thereof is comprised of a hard water resistant material such as a sintered or cemented tungsten carbide material, for example. The cutter is of a segmented construction comprising a mandrel on which a plurality of individual cutter discs are removably stacked and wherein each disc is in the form of a circular member having a plurality of circumferentially spaced cutting teeth extending around the periphery thereof. Each cutting tooth of each disc is provided with a seat in the tipped portion thereof in which an insert of a hard wear resistant material is fixedly secured and wherein the cutting edge of the insert describes a true geometrical helix. Helically oriented coacting means are provided on the mandrel and each of the discs for rotationally positioning each disc relative to the adjacent disc so as to align the helical cutting edges thereon defining in combination a plurality of segmented substantially continuous geometrically true helical cutting edges extending for the entire length of the cutter. Suitable clamping means are provided for removably clamping the discs on the mandrel in face-to-face stacked relationship enabling removal and replacement of one or more discs from time to time as may become necessary during use.

In accordance with the method aspects of the present invention, a helical rotary cutter is produced by forming a plurality of cutter discs each having a plurality of cutting teeth of identical profile and helical lead extending therearound with the cutting edges thereof comprised of a hard wear resistant insert material. The cutting edges of each tooth element are finished in the form of a true geometrical helix and coacting means oriented in a helical form are provided on the discs and a mandrel on which the discs are stacked so as to orient and align the cutting edges on adjacent discs in a manner to define a segmented substantially continuous helical cutting edge extending for the length of the cutter.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is an infinite perspective view of a helical rotary cutter constructed in accordance with the preferred embodiments of the present invention disposed adjacent to a bed knife for pelletizing a plurality of strands of a synthetic material;

FIG. 2 is an exploded perspective view of a rotary cutter illustrating the mandrel and a single disc adapted to be positioned on the mandrel and clamping flanges for retaining the discs thereon;

FIG. 3 is a fragmentary perspective view of a mandrel and bar adapted to be machined so as to define a helical key;

FIG. 4 is a fragmentary magnified transverse sectional view illustrating the disposition of a disc on the mandrel; and FIG. 5 is a plan view, partly in section, of the cutter disc shown in FIG. 4.

DESCRIPTION OF THE PREFERRED EMBODIMENT

Referring now in detail to the drawings, and as may be best seen in FIG. 1, a rotary helical cutter 10 constructed in accordance with the preferred embodiment of the present invention is illustrated in an arrangement exemplary of its use for effecting a pelletizing of a plurality of synthetic resinous or plastic strands or filaments 12 which are continuously advanced toward the cutter in a direction substantially perpendicular to its axis of rotation. In accordance with the arrangement shown, the cutting edges of the rotary cutter are defined by a plurality of individual cutter discs 14 disposed in clamped stacked relationship on a mandrel 16. The cutting edges are oriented adjacent to a longitudinally extending edge 18 of a bed knife assembly 20 on the upper surface of which the strands or filaments 12 are supported as they are advanced toward the cutter. The bed knife assembly 20 preferably includes an insert 22 securely fastened in the forward portion thereof defining the edge 18 which preferably is comprised of a hard wear resistant material such as a cemented or sintered carbide material to enhance its operating life.

It will be apparent that the length of the pellets produced indicated at 24 in FIG. 1, can be carefully controlled by controlling the speed of rotation of the rotary cutter and/or the rate of advancement of the plastic filaments toward the cutter edges. In accordance with the preferred embodiment, the helical lead or pitch of the segmented helical cutting edges indicated at 26 in FIG. 1 is adjusted so as to provide for at least a two tooth overlap on traveling from one end to the opposite end of the cutter whereby a constant cutting action of the advancing plastic filaments is performed which moves from the right hand end of the bed knife as viewed in FIG. 1 toward the left hand end in response to the rotation of the rotary cutter in a clockwise direction as indicated by the arrow. Tooth overlap as herein used is defined as a helical lead which provides at least two cutting edges being in contact with a plane at the same time and which plane intersects the periphery of the cutter along a line parallel to the axis of rotation of the cutter. The gullets 28 separating adjacent cutting edges receive the advancing plastic filaments which subsequently are sheared by the helical cutting edges 26 as the cutter rotates.

It will be understood that the rotary helical cutter 10 as shown in FIG. 1 can also be advantageously employed for alternative pulverizing, size reduction, shredding, planing, and cutting operations in lieu of the specific pelletizing operation as illustrated in FIG. 1.

Referring now to FIGS. 1-3 of the drawings, the mandrel 16 is comprised of an elongated cylindrical center section 30 on which the cutter discs 14 are adapted to be slidably disposed in clamped relationship therealong. Each end of the center section is formed with an axially projecting shaft 32 which are adapted to be disposed in suitable bearings (not shown) for rotatably supporting the cutter for rotation about an axis extending centrally through the mandrel. A stub shaft extension 34 is provided on one outer end of the mandrel 16 which is formed with a key way 36 for coupling the mandrel and rotary cutter to a suitable rotary drive propulsion mechanism (not shown).

As best seen in FIGS. 2-4, the center section 30 of the mandrel is formed with a diagonally extending straight slot 38 within which a rectangular bar 40 is adapted to be removably secured such as by means of thru bolts 42. The outwardly projecting portion of the bar 40 is formed with a rectangular key 46 which is machined with a portion of the periphery of the center section 30 forming a flattened surface 44 as indicated in FIGS. 2 and 4 to describe a true geometrical helix extending for the entire length thereof. The helical key 46 and flattened portion of center section 30 is preferably machined after the bar 40 of FIG. 3 is securely fastened in the slot 38 of the mandrel. In lieu of machining the key 46 after installation on the mandrel, the key can be machined on a fixture simulating the actual mandrel and thereafter installed. In such event, the flattened surface 44 adjacent to the key slot on the periphery of the mandrel is not necessary. It is also contemplated that in lieu of the helical key 46, a plurality of pins can be secured in outward projecting relationship on the center section 30 of the mandrel so as to define a corresponding helical key for appropriately locating the cutter discs in aligned relationship.

Each cutter disc 14 as best seen in FIGS. 2, 4 and 5, is comprised of a circular body formed with a circular cylindrical bore 48 extending through the center thereof which is of a size so as to slidably overlie the periphery of the center section 30 of the mandrel. A key slot 50 is formed in each disc adjacent to the bore 48 and is machined in a true geometrical helix corresponding to that of the helical key 46 affixed to the mandrel. The periphery of each cutter disc is formed with a plurality of tooth elements 52 disposed in substantially equal circumferentially spaced increments therearound which are separated by the inwardly extending gullets 28. The forward outer or tip portion of each tooth element is formed with a notch defining a seat including a mounting face 54 in which a hard wear resistant material insert 56 is fixedly secured such as by means of brazing or the like. Each mounting face 54 as best seen in FIG. 5 is machined substantially flat and at an angle substantially tangent to the helix of the segmented cutting edge. Each insert 56 as best seen in FIGS. 2, 4 and 5 is comprised of a substantially flat rectangular body of standard manufacture and economical cost and may comprise any one of the variety of sintered or cemented carbide wear resistant materials of which tungsten carbide comprises a preferred material. In accordance with the method aspects of the present invention, the cutter disc after a preliminary machining to accurate final dimensions is subjected to an induction brazing treatment in which the carbide inserts 56 are brazed in appropriate position within each of the mounting faces employing a wafer of a suitable brazing material such as the wafer 58 illustrated in FIG. 2 which preferably comprises a silver brazing alloy. It is also contemplated that the inserts 56 can be secured by mechanical interlocking means or fastening devices if space permits.

As best seen in FIGS. 4 and 5, each cutter disc 14 is comprised of two substantially parallel faces 60 while the peripheral portion thereof is inwardly recessed to a circle coinciding with the roots 28 of the teeth as indicated at 61 to permit the side edges of the carbide inserts 56 to project therebeyond to a position contiguous to the plane of the faces 60.

After securing the carbide inserts in the notches provided in each of the tooth elements, the side edges of the inserts are ground such that upon assembly of the discs, the abutting side edges of adjacent inserts are in close proximity, preferably less than about one-thousandths of an inch, so as to define a substantially continuous helical segmented cutting edge. Similarly, the outer edges or relief facets 63 of the inserts are ground in a true geometrical helix and to provide the desired clearance or relief angle indicated at A in FIG. 4 which may conveniently be of a magnitude of about 10 degrees. The mounting faces of the tooth elements are also preferably oriented to position the insert at an appropriate face or rake angle indicated at B in FIG. 4 which may conveniently be 10 degrees or the like. Finally, the forward face or rake facet 62 of each insert is ground to impart a true geometrical helix configuration thereto, corresponding to the helix of the helical key 46 in the mandrel.

It will be noted from the foregoing, that each cutter disc is substantially identical and is completely interchangeable. It is also contemplated that the cutter discs can be of different thicknesses but with the same tooth profile and helical lead to permit stacking on a mandrel.

In order to facilitate installation and removal of the individual cutter discs on the mandrel, each disc is preferably provided with three tapped bores 64 as best seen in FIG. 2 by which a slotted handle 66 can be removably secured thereto by means of a screw 68 facilitating the sliding movement of the disc over the center section of the mandrel and in coacting relationship with the helical key therealong.

In accordance with the foregoing, a plurality of cutter discs are positioned in stacked face-to-face relationship on the center section of the mandrel each with its key slot 50 disposed in engaging relationship with the helical key 46 such that the individual helical cutting edges of each disc is rotationally indexed from the adjacent disc in an amount so as to position the cutting edges in helical alignment forming the substantially continuous segmented helical cutting edge 26 as shown in FIG. 1. The plurality of discs are maintained in stacked relationship along the mandrel with their side faces 60 in appropriate abutting relationship by means of a pair of removable circular clamping flanges 70 which slidably overlie the end shafts 32 as best shown in FIGS. 1 and 2 and are secured by means of machine screws 72 in tapped bores 74 provided in the radial shoulders at each end of the center section 30. To assure the maintainence of appropriate clamped relationship of the stacked discs, it is preferred that the length of the cylindrical center section 30 of the mandrel be slightly less than the total length of the stacked discs such that at least one clamping flange 70 is disposed in a slight axially positioned clearance from the radial shoulder of the center section.

It will be appreciated from the foregoing description, that the rotary cutter assembly is permissive of quick and simple repair in the event of inadvertent damage to the helical cutting edges of one or more cutting discs by simply disassembling the cutter and replacing the damaged discs. It will be further appreciated, that the particular helical lead or pitch of the cutting edges can be varied in accordance with the total axial length of the cutting portion of the rotary cutter and the type of cutting, shredding, planing, milling, pelletizing, etc. operation to be performed in order to achieve optimum operating efficiency.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A rotary cutter having a plurality of hard, wear resistant material tipped helical cutting teeth therealong comprising a mandrel, a plurality of cutter discs removably disposed in stacked relationship on said mandrel, each disc comprising a circular member having a plurality of circumferentially spaced cutting teeth extending around the periphery thereof, each cutting tooth of said disc formed with a seat in the tip portion thereof including a mounting face and a hard wear resistant insert fixedly secured in said seat, said insert having a cutting edge describing a true helix, helically oriented coacting means on said mandrel and each said disc for rotationally positioning each said disc relative to the adjacent said disc to align the helical cutting edges thereon to define a plurality of segmented substantially continuous true geometrical helical cutting edges extending the entire length of the stacked said discs, and means for removably securing said discs on said mandrel in face-to-face abutting relationship.

2. The rotary cutter as defined in claim 1 in which each said mounting face is substantially planar and is disposed at an angle substantially tangent to the helix of the cutting teeth.

3. The rotary cutter as defined in claim 1 in which said helically oriented coacting means comprises a helical key on said mandrel and a helical slot in each said disc for slidably receiving said key.

4. The rotary cutter as defined in claim 3 in which said helical key is formed on a longitudinally extending member secured in a slot formed in said mandrel.

5. The rotary cutter as defined in claim 1 in which said helically oriented coacting means comprises a helical slot formed in said mandrel and a helically projecting key on each said disc slidably engaged in said helical slot.

6. The rotary cutter as defined in claim 2 in which said insert is of a rectangular configuration including a substantially planar face disposed in opposed relationship to said mounting face.

7. The rotary cutter as defined in claim 1 in which said insert is comprised of a cemented carbide material.

8. The rotary cutter as defined in claim 1 in which each said disc further includes at least one aperture extending axially therethrough for removably securing a member thereto to facilitate handling of said disc during stacking and removal thereof on said mandrel.

9. The rotary cutter as defined in claim 1 in which the lateral side edges of each of said inserts are disposed in spaced relationship of less than about 0.001 inch from the side edge of the adjacent said insert.

10. The rotary cutter as defined in claim 1 in which said mandrel is of a circular cylindrical configuration and each said disc is formed with a central bore to slidably overlie said mandrel.

11. The rotary cutter as defined in claim 1 in which each said insert is secured by brazing.

12. The rotary cutter as defined in claim 1 in which the helical lead of said helix is of a magntiude to provide at least a two tooth overlap on moving from one end to the opposite end of said stacked discs.

13. The rotary cutter as defined in claim 1 in which said helically oriented coacting means comprises a straight slot formed in the periphery of said mandrel and extending diagonally for substantially the entire length thereof and disposed at an angle to the longitudinal center axis of said mandrel, a straight bar secured in said slot including a portion projecting outwardly of the periphery of said mandrel defining a key disposed in a true geometrical helix, and a helical slot in each said disc for slidably engaging the helical said key.

14. The method of making a rotary cutter having a plurality of hard, wear resistant material tipped helical cutting teeth thereon which comprises the steps of forming a plurality of identical cutter discs each comprising a circular member having a plurality of circumferentially spaced cutting teeth extending around the periphery thereof, forming a seat having a mounting face in the tip portion of each cutting tooth, affixing a hard, wear resistant insert in each said seat, abrasive finishing each said insert to impart a true helical cutting edge therealong, providing a mandrel, forming helically oriented coacting means on said mandrel and said discs having the same helical lead as the cutting edges, stacking a plurality of said discs on said mandrel in face-to-face relationship and in cooperating engagement with said coacting means to rotationally position each said disc in a position relative to the adjacent said disc to align the helical cutting edges thereon to define a plurality of segmented substantially continuous helical cutting edges extending for the entire length of the stacked said discs, and removably securing the stacked said discs in helically aligned relationship on said mandrel.

15. The method as defined in claim 14 in which the steps of forming a seat having a mounting face in each cutting tooth includes forming the mounting face of a substantially planar configuration and angularly disposed at an angle substantially tangent to the helix of said cutting edges.

16. The method as defined in claim 14 in which said inserts comprise a hard, wear resistant cemented carbide material and said abrasive finishing step is performed with a suitable abrasive wheel.

* * * * *